United States Patent [19]
Nagai et al.

[11] Patent Number: 5,882,390
[45] Date of Patent: Mar. 16, 1999

[54] RECORDING INK COMPOSITION AND RECORDING METHOD USING THE SAME

[75] Inventors: Kiyofumi Nagai; Akio Kojima, both of Tokyo; Masato Igarashi; Akiko Konishi, both of Kanagawa; Hiroyuki Mochizuki, Tokyo; Takanori Tsuyuki; Masayuki Koyano, both of Kanagawa; Ikuko Tanaka, Tokyo, all of Japan

[73] Assignee: Ricoh Company, Ltd, Tokyo, Japan

[21] Appl. No.: 899,651

[22] Filed: Jul. 24, 1997

[30] Foreign Application Priority Data

Jul. 25, 1996 [JP] Japan ................................ 8-214404

[51] Int. Cl.$^6$ .................................................. C04D 11/02
[52] U.S. Cl. .................................... 106/31.49; 106/31.58; 106/31.78; 106/31.86; 106/31.87; 106/411
[58] Field of Search ........................... 106/31.49, 31.58, 106/31.78, 31.86, 31.87, 411

[56] References Cited

U.S. PATENT DOCUMENTS

| | | | |
|---|---|---|---|
| 3,960,587 | 6/1976 | Huille et al. | 106/411 |
| 4,205,995 | 6/1980 | Wheller et al. | 106/411 |
| 4,647,310 | 3/1987 | Shimada et al. | 106/31.48 |
| 4,711,668 | 12/1987 | Shimada et al. | 106/31.52 |
| 4,793,860 | 12/1988 | Murakami et al. | 106/31.52 |
| 5,431,720 | 7/1995 | Nagai et al. | 106/31.58 |
| 5,472,490 | 12/1995 | Sawamura et al. | 106/411 |
| 5,514,208 | 5/1996 | Nagai et al. | 106/31.43 |

*Primary Examiner*—Helene Klemanski
*Attorney, Agent, or Firm*—Oblon, Spivak, McClelland, Maier & Neustadt, P.C.

[57] ABSTRACT

A recording ink composition contains a colorant which is soluble or dispersible in water and includes at least one phthalocyanine compound of formula (1) which may have a halogen atom as a substituent and at least one of phthalocyanine compounds of formulas (2) and (3); a dispersant which includes at least one polymeric compound having a hydrophilic moiety and a hydrophobic moiety, and/or at least one surfactant having an alkyl group having 5 or more carbon atoms; water; and a humectant. In addition, images with a resolution of 10 dots/mm×10 dots/mm or more can be recorded on an image receiving medium by ejecting the above-mentioned recording ink composition in the form of droplets by the application of thermal or mechanical energy thereto onto an image receiving medium with a Stöckigt size degree of 3 seconds or more, with the recording ink composition being deposited in an amount of 20 pl/mm$^2$ to 200 pl/mm$^2$ on the image receiving medium.

12 Claims, No Drawings

RECORDING INK COMPOSITION AND RECORDING METHOD USING THE SAME

BACKGROUND OF THE INVENTION

1. Field of the Invention

The present invention relates to a recording ink composition suitable for an ink-jet printer, aqueous writing utensils, various kinds of recorders and pen plotters, and more particularly to a recording ink composition capable of producing color images on a sheet of plain paper by the ink-jet printing method. In addition, the present invention relates to an ink-jet printing method using the above-mentioned recording ink composition.

2. Discussion of Background

Ink-jet printers have been widely utilized in recent years because of the advantages of low noise and low running cost, and color ink-jet printers capable of producing color images on a sheet of plain paper have also been placed on the market.

With respect to such ink-jet printers, however, it is required to satisfy all the requirements, such as excellent color reproduction of color image, high water- and light-resistances of the obtained image, sufficient drying characteristics of the image, high image quality without blurring, and the reliability of ink-ejection from the printer.

Dyes and pigments for use in the ink composition have been improved in order to satisfy both the requirements of the color reproduction of color images formed on a sheet of plain paper and the light resistance and water resistance of such color images at the same time. However, it was difficult to obtain an ink composition capable of producing color images with the improved light and water resistances without the decrease of reliability of ink-ejection and the deterioration of color reproduction.

For instance, there are disclosed cyan color ink compositions in Japanese Laid-Open Patent Applications 63-210175, 1-126381 and 1-19077, each of which comprises a carboxylic-group-introduced copper phthalocyanine dye. Although the water resistance of the image obtained by use of the above-mentioned ink composition is superior, the light resistance thereof is inferior, as compared with the water and light resistances of the image obtained by use of an ink composition comprising a sulfonic-group-introduced phthalocyanine dye. Due to such insufficient light resistance of the recorded image, the color image tends to fade by the application of light thereto, so that the above-mentioned ink composition is not suitable for printing a poster which is bound to be exposed to light for an extended period of time.

It is conventionally proposed to use various pigments for the ink composition in order to obtain sufficient water resistance and light resistance of the recorded ink image. However, since the color tone of the pigments is unsatisfactory, such an ink composition as comprises a pigment is now only applied to a large-sized plotter which is required to produce images with extremely high light resistance. In addition, when the aqueous ink composition comprising a pigment is set in an ink-jet printer which is designed to produce images with high resolution, the nozzle of the printer easily tends to be clogged with the ink composition, so that the reliability of the ink ejection becomes very low.

Therefore, it is proposed to use a pigment and a dye in combination for the ink composition for improving the color tone of the ink composition so as to upgrade the color reproduction of the obtained color images, improving the light resistance and water resistance of the obtained image, and preventing the reliability of the ink ejection performance from decreasing. For example, Japanese Patent Publication 60-45668 discloses a recording ink composition which comprises water, a water-soluble blue dye and blue pigment, and a polymeric dispersant. However, not only the light resistance and water resistance of the dye component are insufficient, but also the penetration performance of the obtained ink composition through a sheet of plain paper and the color development of color image are not always satisfactory.

When the color images are produced, in particular, by using the color ink-jet printer, image blurring easily takes place in a secondary color image portion of a red, green or blue color obtained by superimposing the two colored inks and the boundaries thereof, even though the image clearness is sufficient in an image portion of a yellow, magenta or cyan color prepared by use of the ink composition of a single color.

Particularly, when the ink deposited on a sheet of paper is dried without any specific image-fixing unit, the drying characteristics of the ink are improved by increasing the penetrating property of the ink through the paper, as described in Japanese Laid-Open Patent Application 55-29546. However, because of the increase of the penetrating property of the ink through paper, obtained images are easily blurred and the sharpness of the obtained images is decreased depending on the kind of recording paper to be employed.

It is described in Japanese Patent Publication 60-23793 that the drying characteristics of the images obtained by ink-jet recording can be improved without decrease of the sharpness of the obtained image when a dialkylsulfosuccinate is contained as the surfactant in the ink composition. However, when such an ink composition is used for ink-jet printing, the diameter of a picture element of the obtained image conspicuously varies depending on the kind of image receiving sheet to be employed. As a result, the image density of the printed images is considerably decreased, and the sharpness of the printed images is lowered. In addition, this kind of surfactant is easily decomposed if an ink composition is alkaline, so that the activating effect of the surfactant is impaired during the storage of the ink composition. The result is that the wettability of the recording paper by this ink composition is lowered, so that the drying characteristics of the recorded image are changed. Thus, the image deterioration will occur at the boundaries of the secondary color image.

An ink composition comprising a strongly basic material is disclosed in Japanese Laid-Open Patent Application 56-57862 for the purpose of improving the drying characteristics of the images recorded by ink-jet printing. The drying characteristics of the image formed on a so-called acidic paper which has been sized by use of rosin can be improved. However, the improvement in drying characteristics is not observed when the image is printed on a paper which is prepared by use of a sizing agent such as alkyl ketene dimer or alkenyl sulfosuccinic acid. Even when the acidic paper is employed, the drying characteristics of the secondary color image portion formed by superimposing the two colored inks are still insufficient.

There is proposed a recording ink composition comprising a polyhydric alcohol derivative and pectin as disclosed in Japanese Laid-Open Patent Application 1-203483. In this ink composition, pectin is contained as a thickening agent to prevent the blurring of ink image obtained on the paper.

However, since pectin is a nonionic material having a hydroxyl group as a hydrophilic group, the reliability of ink ejection is decreased, for example, when the printing operation is resumed after intermission.

SUMMARY OF THE INVENTION

Accordingly, a first object of the present invention is to provide a recording ink composition with excellent color tone, to be more specific, of a cyan color, which is suitable for ink-jet printing, and capable of producing color images with excellent color reproduction, and improved water resistance and light resistance on an image receiving medium such as a sheet of plain paper, and in addition, capable of producing images with excellent transparency and excellent color reproduction of a blue color and a green color on a transparent sheet for use with an overhead projector (OHP).

A second object of the present invention is to provide a recording ink composition capable of producing sharp images on a sheet of plain paper free from image blurring, without decreasing the drying characteristics of the produced images.

A third object of the present invention is to provide a recording ink composition with excellent preservation stability and ejection stability after a long-term storage or intermission of printing operation.

A fourth object of the present invention is to provide an ink-jet recording method capable of producing sharp color images with excellent color reproduction and high resolution, and improved water resistance and light resistance by use of the above-mentioned recording ink composition.

The first to third objects of the present invention can be achieved by a recording ink composition comprising (i) a colorant which is soluble or dispersible in water and comprises at least one phthalocyanine compound represented by formula (1),

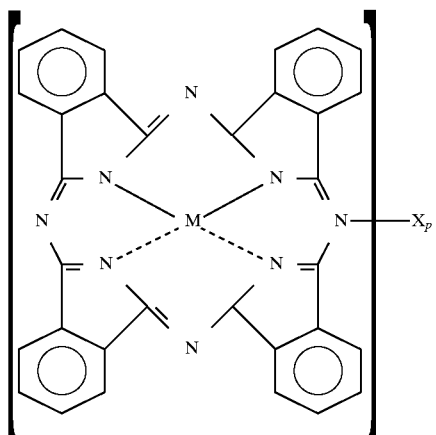

wherein M is a hydrogen atom, Cu, Fe, Co or Ni, X is a halogen atom, and p is an integer of 0 to 8; and at least one phthalocyanine compound selected from the group consisting of compounds represented by formulas (2) and (3),

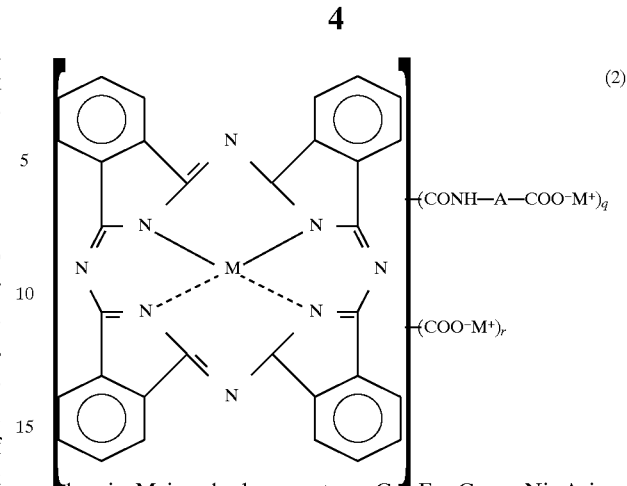

wherein M is a hydrogen atom, Cu, Fe, Co or Ni, A is a phenylene group or a straight-chain or branched alkylene group having 1 or more carbon atoms, $M^+$ is a cation selected from the group consisting of alkali metal cation, quaternary ammonium cation, quaternary phosphonium cation, and alkanolamine cation, and q is an integer of 0 to 4, and r is an integer of 0 to 8, provided that q and r cannot be 0 (zero) at the same time; and

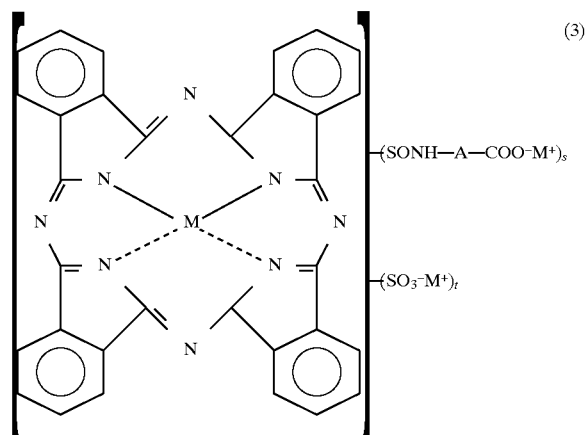

wherein M is a hydrogen atom, Cu, Fe, Co or Ni, A is a phenylene group or a straight-chain or branched alkylene group having 1 or more carbon atoms, $M^+$ is a cation selected from the group consisting of alkali metal cation, quaternary ammonium cation, quaternary phosphonium cation, and alkanolamine cation, and s is an integer of 0 to 4, and t is an integer of 0 to 4, provided that s and t cannot be 0 (zero) at the same time; (ii) a dispersant comprising at least one dispersant component selected from the group consisting of at least one polymeric compound having a hydrophilic moiety and a hydrophobic moiety, and at least one surfactant having an alkyl group having 5 or more carbon atoms; (iii) water; and (iv) a humectant.

The fourth object of the present invention can be achieved by a method of recording images on an image receiving medium, comprising the step of ejecting the above-mentioned recording ink composition in the form of droplets by the application of thermal or mechanical energy thereto onto an image receiving medium with a Stöckigt size degree of 3 seconds or more, with the recording ink composition being deposited in an amount of 20 pl/mm² to 200 pl/mm² on the image receiving medium, thereby forming images with a resolution of 10 dots/mm×10 dots/mm or more.

DESCRIPTION OF THE PREFERRED EMBODIMENTS

A recording ink composition according to the present invention comprises a colorant which is soluble or dispersible in water and comprises at least one phthalocyanine compound of formula (1) and at least one phthalocyanine compound of formula (2) or (3). Because of the combination of these phthalocyanine compounds, the recording ink composition of the present invention assumes a cyan color with excellent color tone, and can yield color images with excellent color reproduction, and in addition, the water resistance and light resistance of the thus recorded images are remarkably improved.

In particular, by use of the recording ink composition of the present invention, it is possible to produce a blue color image and a green color image with excellent color reproduction on a sheet of plain paper, and in addition, a blue color image and a green color image with excellent transparency on a transparent sheet for use with the OHP.

In the case where the phthalocyanine compound of formula (1) is used alone as the colorant for an ink composition, the hue and saturation of the obtained color image are insufficient and the color reproduction is poor even though the phthalocyanine compound of formula (1) is employed in the form of finely-divided particles. However, when the phthalocyanine compound of formula (1) is used in combination with the phthalocyanine compound of formula (2) or (3) for the colorant, as shown in the present invention, not only the hue of the obtained image can be adjusted and the saturation thereof can be improved, but also the water resistance and light resistance of the recorded images can be improved due to these phthalocyanine compounds.

Furthermore, the dispersant for use in the recording ink composition of the present invention comprises a polymeric compound having a hydrophilic moiety and a hydrophobic moiety and/or a surfactant comprising an alkyl group having 5 or more carbon atoms. Because of the presence of the above-mentioned dispersant, the penetrating performance of the ink composition through an image receiving medium such as a sheet of plain paper can be improved, thereby improving the drying characteristics of the recorded image, and at the same time, the spreading of the recorded ink image can be prevented, thereby obtaining clear ink images.

Specific examples of the phthalocyanine compound of formula (1) are as follows:

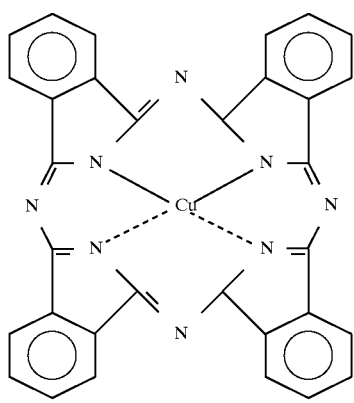
(1-1)

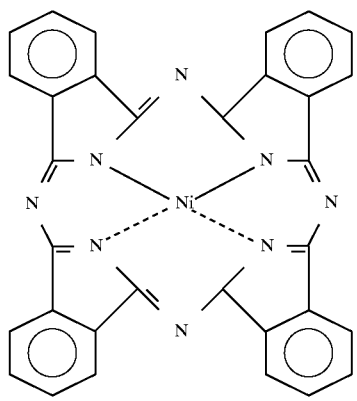
(1-2)

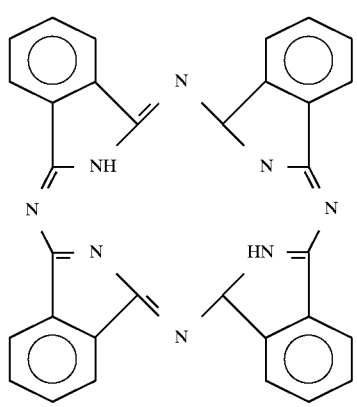
(1-3)

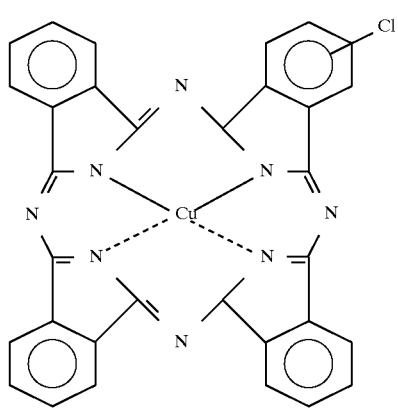
(1-4)

(1-5)
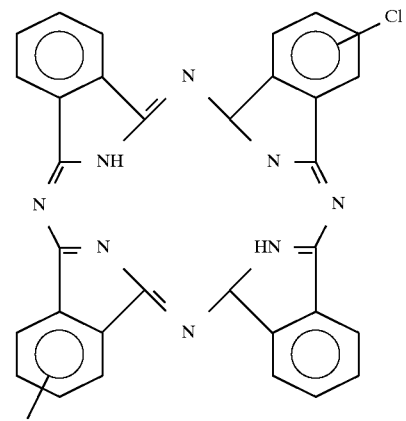
(1-6)
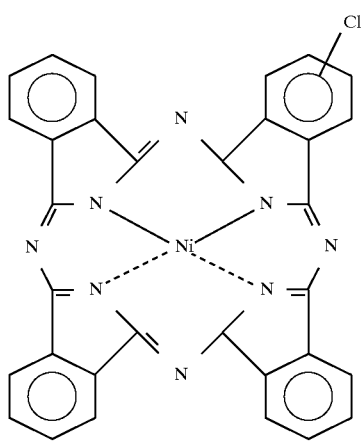
(1-7)
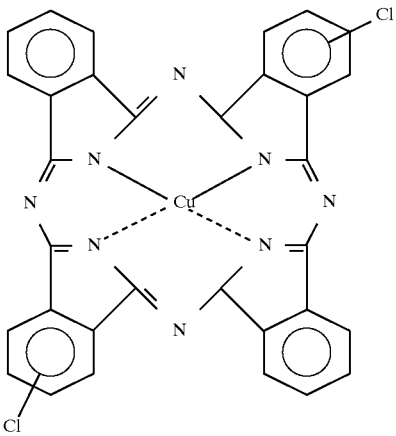
Specific examples of the phthalocyanine compound of formula (2) in the form of a free acid are as follows:
(2-1)
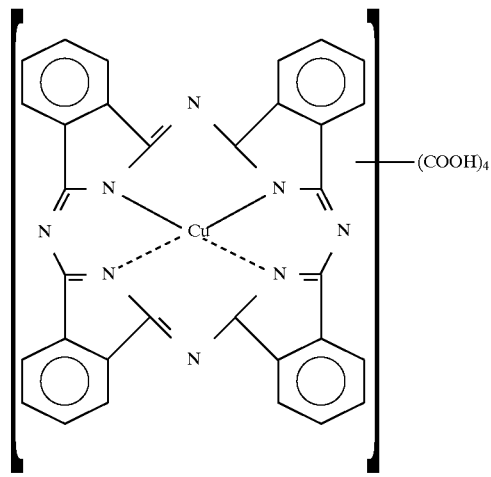

-continued
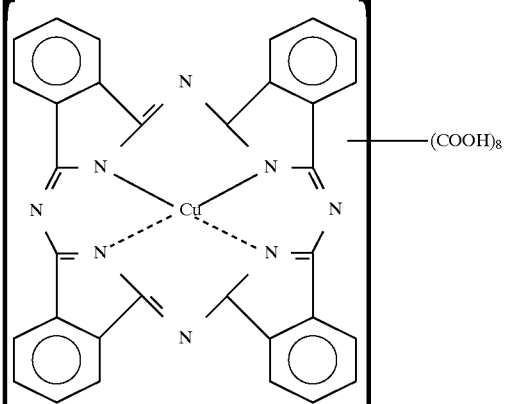
(2-2)
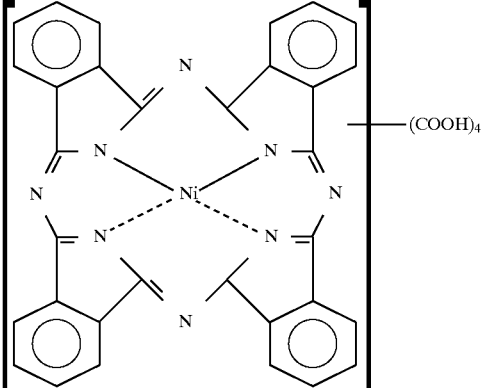
(2-3)
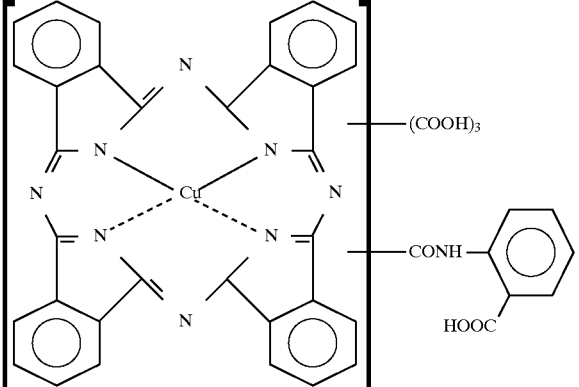
(2-4)
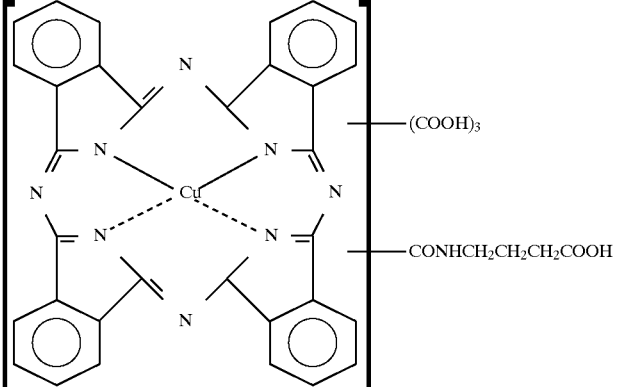
(2-5)

Specific examples of the phthalocyanine compound of formula (3) in the form of a free acid are as follows:
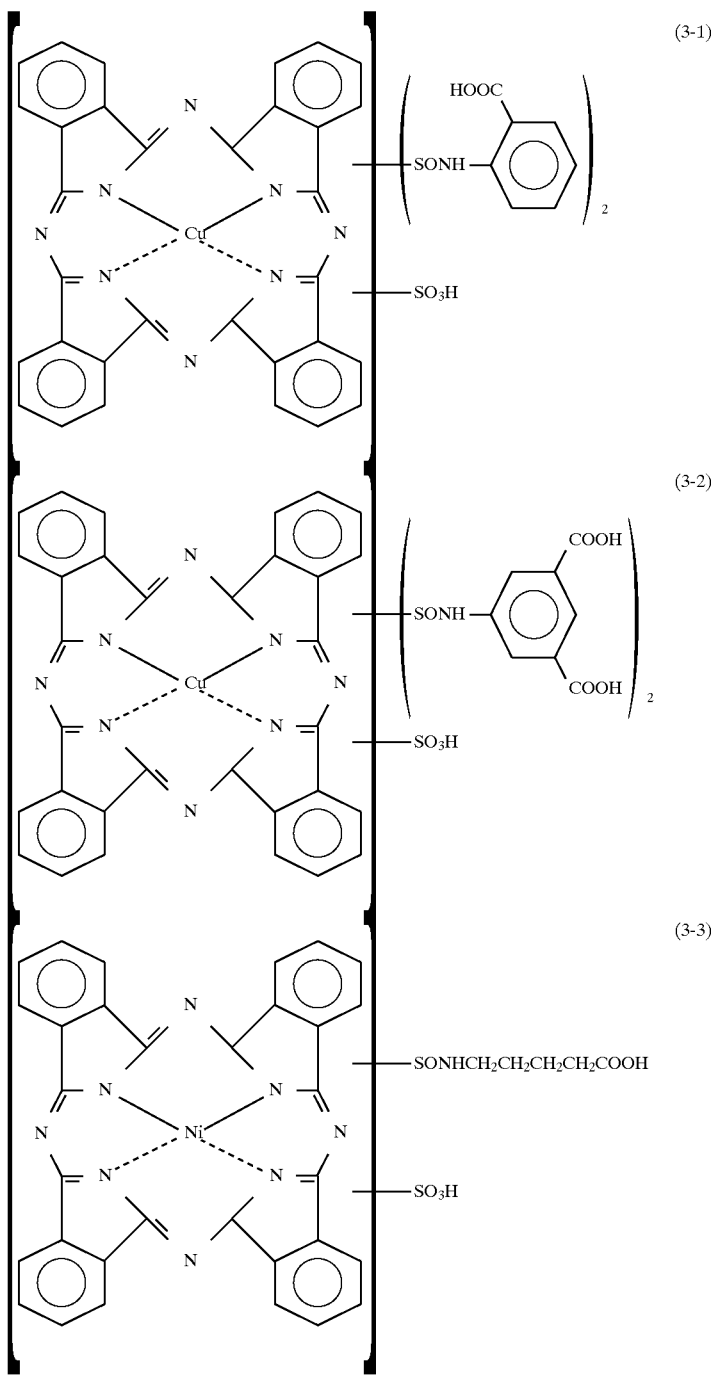

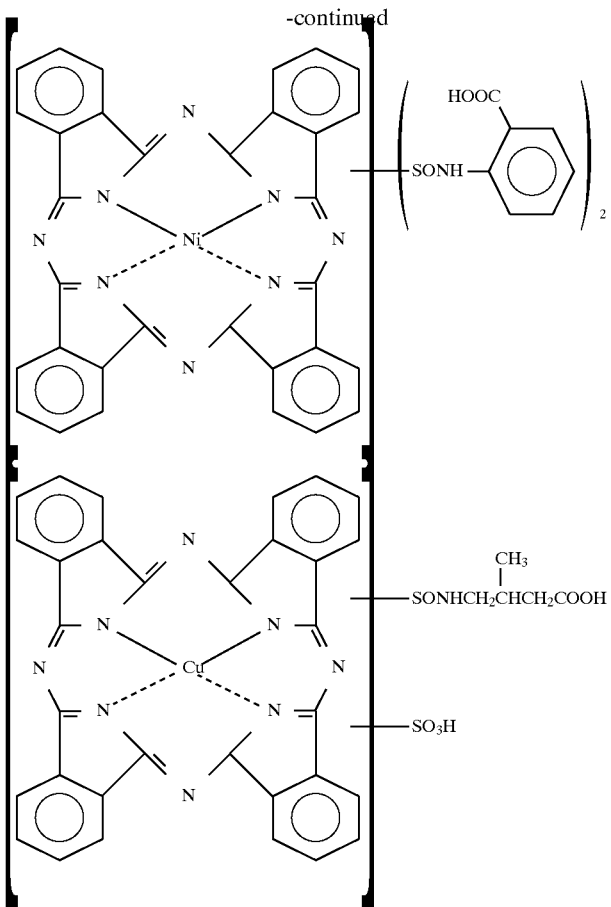

(3-4)

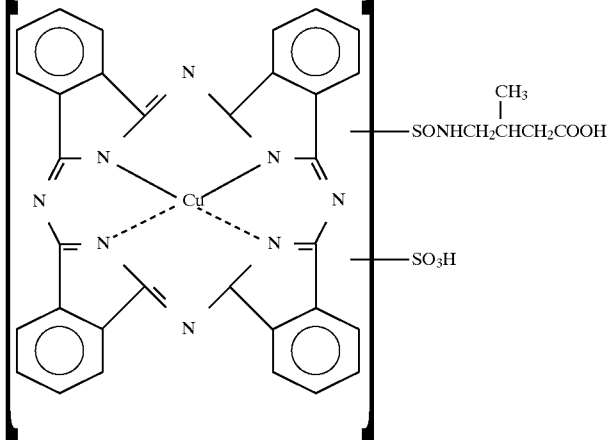

(3-5)

It is preferable that the above-mentioned phthalocyanine compounds be purified by use of an ion exchange resin, or by subjecting to reverse osmosis or ultrafiltration before the preparation of the ink composition. This is because the phthalocyanine compounds for use in the present invention tend to contain impurities such as polyvalent metal ion, chloride ion and sulfate ion in the course of synthesis thereof. By subjecting the phthalocyanine compounds to such purification treatment, a nozzle of the ink-jet printer can be prevented from being clogged with the obtained ink composition in the course of ink-jet printing operation.

In the recording ink composition of the present invention, it is preferable that the phthalocyanine compound of formula (1) be in the form of finely-divided particles with a particle diameter in a range of 0.01 to 0.1 μm.

In order to improve the solubility stability of the phthalocyanine compound of formula (2) or (3) for use in the present invention, it is preferable that, in the formulas (2) and (3), the alkali metal cation represented by $M^+$ be selected from the group consisting of $Na^+$ and $Li^+$; the quaternary ammonium cation represented by $M^+$ be represented by formula (4-a):

(4-a)

wherein $R^1$ to $R^4$ each is selected from the group consisting of a hydrogen atom, an alkyl group having 1 to 4 carbon atoms, and a halogenated alkyl group having 1 to 4 carbon atoms; the alkanolamine cation represented by $M^+$ be a cation represented by formula (4-b):

(4-b)

wherein at least one of $R^{11}$ to $R^{14}$ is a hydroxyalkyl group having 1 to 4 carbon atoms, and the other is selected from the group consisting of a hydrogen atom, an alkyl group having 1 to 4 carbon atoms, and a halogenated alkyl group having 1 to 4 carbon atoms; and that the quaternary phosphonium cation represented by $M^+$ be a cation represented by formula (4-c):

(4-c)

wherein $R^{21}$ to $R^{24}$ each is selected from the group consisting of a hydrogen atom, an alkyl group having 1 to 4 carbon atoms, a hydroxyalkyl group having 1 to 4 carbon atoms, and a halogenated alkyl group having 1 to 4 carbon atoms.

A desired counter cation represented by $M^+$ can be obtained for the phthalocyanine compound of formula (2) or (3) by adding to the formulation for the ink composition sodium hydroxide, lithium hydroxide, or hydroxides as shown below:

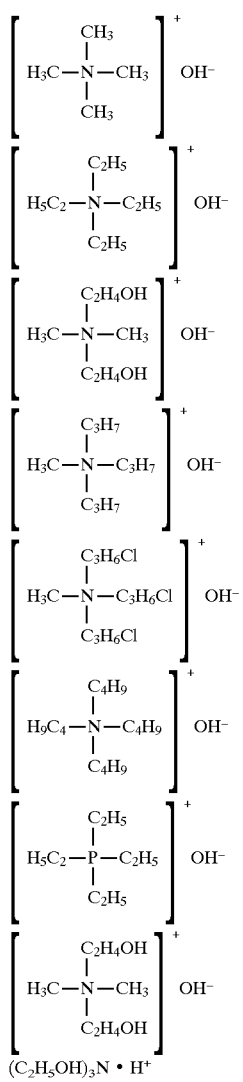

(4-1)

(4-2)

(4-3)

(4-4)

(4-5)

(4-6)

(4-7)

(4-8)

$(C_2H_5OH)_3N \cdot H^+$

When the particle diameter of the phthalocyanine compound of formula (1) is in the range of 0.01 to 0.1 μm in the ink composition, and the counter cation represented by $M^+$ for use in the phthalocyanine compound of formula (2) or (3) is selected from the group consisting of alkali metal cation such as sodium cation or lithium cation, quaternary ammonium cation, quaternary phosphonium cation and alkanolamine cation, the preservation stability of the obtained recording ink composition can be improved. Therefore, ink-jet printing can be carried out with maintaining high reliability of ink ejection, free from the clogging of the nozzle, when the ink composition of the present invention is used for the ink-jet printer.

The recording ink composition according to the present invention comprises a dispersant which comprises at least one dispersant component selected from the group consisting of at least one polymeric compound having a hydrophilic moiety and a hydrophobic moiety, and at least one surfactant comprising an alkyl group having 5 or more carbon atoms.

As the aforementioned surfactant comprising an alkyl group having 5 or more carbon atoms, it is preferable to employ an anionic surfactant such as a polyoxyethylene alkyl ether acetate of the following formula (5):

$$R^5-O-(CH_2CH_2O)_m CH_2COO^- M^+ \quad (5)$$

wherein $R^5$ is a straight-chain or branched alkyl group having 6 to 14 carbon atoms, $M^+$ is a cation selected from the group consisting of alkali metal cation, quaternary ammonium cation, quaternary phosphonium cation and alkanolamine cation, and m is an integer of 3 to 12; or a dialkylsulfosuccinate of formula (6),

(6)

wherein $R^6$ is a branched alkyl group having 5 to 7 carbon atoms, and $M^+$ is a cation selected from the group consisting of alkali metal cation, quaternary ammonium cation, quaternary phosphonium cation and alkanolamine cation.

By use of the above-mentioned anionic surfactants, the penetrating performance of the ink composition into the image receiving medium such as a sheet of plain paper can be increased, so that the drying characteristics of the recorded images are improved. At the same time, sharp images can be produced on the image receiving medium without spreading of ink.

It is considered that this is because when the above-mentioned anionic surfactants are used in the ink composition, the viscosity of the ink composition is increased by protons supplied from the surface of the image receiving medium such as a sheet of plain paper, so that the spreading of the aqueous ink composition is reduced.

In particular, by the addition of the above-mentioned polyoxyethylene alkyl ether acetate or dialkylsulfosuccinate to the ink composition, the surface tension of the ink composition may be adjusted to 50 mN/m or less, more preferably 40 mN/m or less. Thus, the wettability of the image receiving medium with the ink composition is further improved, so that the penetrating performance of the ink composition into the image receiving medium can be increased. Therefore, when printing is performed by use of the ink composition comprising the above-mentioned polyoxyethylene alkyl ether acetate or dialkylsulfosuccinate, for instance, on a sheet of plain paper, the drying rate of the printed images is high and the sharpness of the image is also high.

The surface tension of the recording ink composition of the present invention is an indication of the penetration of the ink composition into recording paper. Particularly, in the present invention, the surface tension indicates a dynamic surface tension of a droplet of the ink composition measured within a short period of time of one second or less after the formation of the surface of a droplet on the recording paper. The dynamic surface tension is entirely different from the so-called static surface tension which is measured at a saturation time in equilibrium.

In the present invention, the above-mentioned dynamic surface tension of the recording ink composition may be measured by any of the conventional methods, for example, by a method described in Japanese Laid-Open Patent Application 63-31237, in which the dynamic surface tension is determined by use of the Wilhelmy's surface balance.

Specific examples of the polyoxyethylene alkyl ether acetate of formula (5) in the form of a free acid are as follows:

$CH_3(CH_2)_{12}O(CH_2CH_2O)_3CH_2COOH$ (5-1)

$CH_3(CH_2)_{12}O(CH_2CH_2O)_4CH_2COOH$ (5-2)

$CH_3(CH_2)_{12}O(CH_2CH_2O)_5CH_2COOH$ (5-3)

-continued $$CH_3(CH_2)_{12}O(CH_2CH_2O)_6CH_2COOH \quad (5\text{-}4)$$

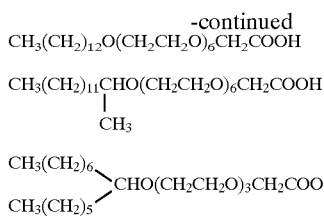
(5-5)

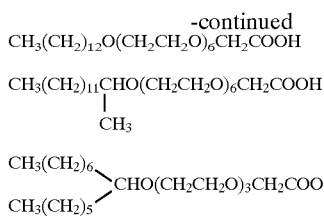
(5-6)

Specific examples of the dialkylsulfosuccinate of formula (6) in the form of a free acid are as follows:

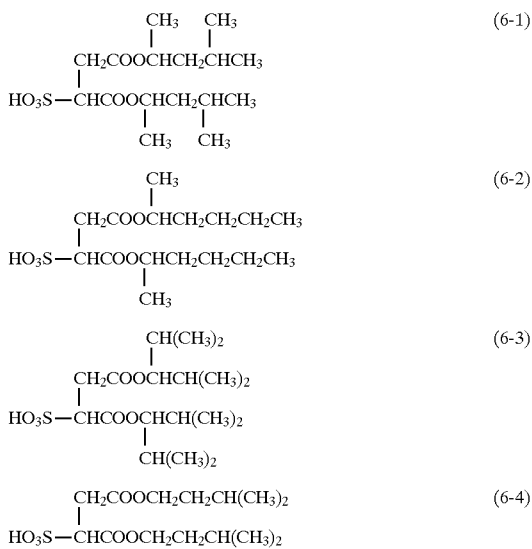

In the above-mentioned anionic surfactants of formulas (5) and (6), it is especially preferable that the cation represented by $M^+$ be selected from the group consisting of $Na^+$, $Li^+$, quaternary ammonium cation represented by the previously mentioned formula (4-a), alkanolamine cation of formula (4-b) and quaternary phosphonium cation of formula (4-c).

When the cation represented by $M^+$ in the formulas (5) and (6) is the above-mentioned alkali metal cation such as $Na^+$ and $Li^+$, the quaternary ammonium cation, the alkanolamine cation, or the quaternary phosphonium cation, the solubility stability of such anionic surfactants can be further improved, thereby obtaining an ink composition with excellent preservation stability. Therefore, ink-jet printing can be stably carried out with high ink-ejection reliability even after the ink composition is allowed to stand for an extended period of time.

By the addition of, for example, sodium hydroxide, lithium hydroxide or any of the previously mentioned formulas (4-1) to (4-9) to the formulation for the ink composition, the desired cation represented by $M^+$ can be obtained for the anionic surfactants of formulas (5) and (6).

In the present invention, it is preferable that such an anionic surfactant of formula (5) or (6) be employed in an amount in the range of 0.05 to 10 wt. % of the entire weight of the ink composition.

By the addition of the anionic surfactant within the above-mentioned amount range, the penetrating performance of the ink composition into an image receiving medium becomes satisfactory in the ink-jet printing. If the amount of such an anionic surfactant is less than 0.05 wt. %, the boundaries of the secondary color image portion 3 obtained by superimposing the two colored inks tend to be blurred. On the other hand, when the amount of the anionic surfactant exceeds 10 wt. %, the anionic surfactant tends to be precipitated at low temperature, and the phthalocyanine compound (2) or (3) also tends to be precipitated, with the result that the ejection reliability of the ink composition is decreased in the ink-jet printing operation.

As previously mentioned, when the cation represented by $M^+$ for use in the phthalocyanine compounds of formulas (2) and (3), or the anionic surfactants (5) and (6) is selected from the group consisting of sodium cation, lithium cation, quaternary ammonium cation, quaternary phosphonium cation, and alkanolamine cation, the solubility stabilities of the phthalocyanine compounds or anionic surfactants can be improved. However, it is not always necessary that all of the counter cations represented by $M^+$ consist of the above-mentioned cations. Those cations may be mixed with other alkali cations.

It is preferable that the amount of cation such as sodium cation, lithium cation, quaternary ammonium cation, quaternary phosphonium cation, or alkanolamine cation be 30% or more, and more preferably 50% or more of the amount of the phthalocyanine compound of formula (2) or (3), or the anionic surfactant (5) or (6) in terms of molar amount.

As the surfactant comprising an alkyl group having 5 or more carbon atoms, it is also preferable to employ a nonionic surfactant, such as polyoxyethylene alkylphenyl ether of the following formula (7):

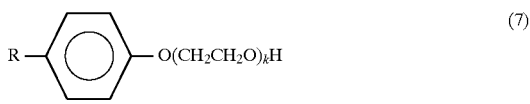
(7)

wherein R is a straight-chain or branched hydrocarbon chain having 6 to 14 carbon atoms, and k is an integer of 5 to 12; or an acetylene glycol of the following formula (8):

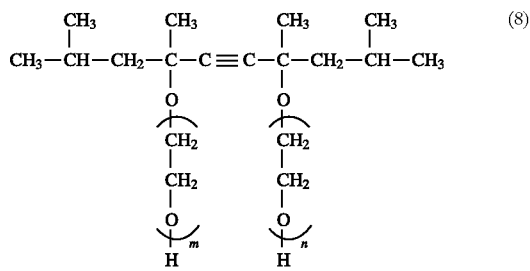
(8)

wherein m and n are each an integer of 0 to 20.

In the polyoxyethylene alkylphenyl ether of formula (7), the hydrocarbon chain represented by R is, for example, an alkyl group or an alkenyl group.

By the addition of the above-mentioned nonionic surfactant to the ink composition, the penetrating performance of the ink composition into the image receiving medium such as a sheet of plain paper can be increased, so that the drying characteristics of the recorded images are improved, and at the same time, sharp image can be produced on the image receiving medium without spreading of ink composition.

In particular, by the addition of the above-mentioned nonionic surfactant such as polyoxyethylene alkylphenyl ether of formula (7) or acetylene glycol of formula (8) to the ink composition, the surface tension of the ink composition may be controlled to 50 mN/m or less, more preferably 40 mN/m or less. Thus, the wettability of the plain paper with the ink composition can be further improved, so that the penetrating performance of the ink composition into the plain paper can be increased. Therefore, when printing is performed, for instance, on a sheet of plain paper, the drying rate of the printed images is high and the image clearness is also high.

Furthermore, when urea and/or a urea derivative such as hydroxyethyl urea or dihydroxyethyl urea is used in combination with the above-mentioned nonionic surfactant such as polyoxyethylene alkylphenyl ether or acetylene glycol, the interaction between the phthalocyanine compound of formula (1), (2) or (3) and the nonionic surfactant is weakened, and the association of molecules of the phthalocyanine compound is loosened, whereby the penetrating performance of the ink composition into the image receiving medium can be improved, and the ejection stability and extended preservation stability of the ink composition can be significantly improved.

It is preferable that urea or derivatives thereof be added to the ink composition in an amount in the range of 0.1 to 5 wt. % of the entire weight of the ink composition in order to obtain the effect thereof sufficiently, without changing the viscosity of the ink composition when water is evaporated from the aqueous ink composition.

Furthermore, the polymeric compound comprising a hydrophilic moiety and a hydrophobic moiety may be contained in the ink composition of the present invention as a pigment dispersant.

Examples of the above-mentioned pigment dispersant for use in the present invention are natural hydrophilic polymers, for example, vegetable polymers such as gum arabic, tragacanth gum, guar gum, karaya gum, locust bean gum, arabinogalactan, pectin, and quince seed starch; seaweed polymers such as alginic acid, carrageenan, and agar; animal polymers such as gelatin, casein, albumin, and collagen; microbial polymers such as xanthene, and dextran; semisynthetic hydrophilic polymers, for example, cellulose polymers such as methyl cellulose, ethyl cellulose, hydroxyethyl cellulose, hydroxypropyl cellulose, and carboxymethyl cellulose; starch polymers such as starch sodium glycolate, and starch sodium phosphate; and seaweed-based polymers such as sodium alginate, and propyleneglycol alginate; and synthetic hydrophilic polymers, for example, vinyl polymers such as polyvinyl alcohol, polyvinyl pyrrolidone, and polyvinyl methyl ether; acrylic resins such as non-crosslinked polyacrylamide, polyacrylic acid and alkali metal salts thereof, and water-soluble styrene-acrylic resin; water-soluble styrene-maleic acid resin; water-soluble vinylnaphthalene-acrylic resin; water-soluble vinylnaphthalene-maleic acid resin; an alkali metal salt of a condensation product of formalin and β-naphthalene-sulfonic acid; a polymeric compound comprising a salt having a cationic functional group such as quaternary ammonium or amino group on the side chain thereof; and a natural polymeric compound such as shellac wax.

In the recording ink composition of the present invention, the previously mentioned components are dispersed or dissolved in water. The recording ink composition of the present invention further comprises a humectant, such as a water-soluble organic solvent so as to prevent the ink composition from drying during the storage thereof, and to improve the solubility stability of the phthalocyanine compound of formula (2) or (3) in the ink composition.

Examples of the water-soluble organic solvent for use in the present invention include polyhydric alcohols such as ethylene glycol, diethylene glycol, triethylene glycol, polyethylene glycol, polypropylene glycol, 1,5-pentanediol, 1,6-hexanediol, glycerol, 1,2,6-hexanetriol, 1,2,4-butanetriol, 1,2,3-butanetriol, and 3-methylpentane-1,3,5-triol; alkyl ethers derived from polyhydric alcohols such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether; aryl ethers derived from polyhydric alcohols such as ethylene glycol monophenyl ether, and ethylene glycol monobenzyl ether; nitrogen-containing heterocyclic compounds such as N-methyl-2-pyrrolidone, N-hydroxyethyl-2-pyrrolidone, 2-pyrrolidone, 1,3-dimethylimidazolidinone, and ε-caprolactam; amides such as formamide, N-methylformamide, and N,N-dimethylformamide; amines such as monoethanol amine, diethanol amine, triethanol amine, monoethylamine, diethyl amine, and triethyl amine; sulfur-containing compounds such as dimethyl sulfoxide, sulfolane, and thiodiethanol; propylene carbonate; ethylene carbonate; and γ-butyrolactone.

Those water-soluble organic solvents may be used alone or in combination.

Of those organic solvents, there are preferably employed diethylene glycol, thiodiethanol, polyethylene glycol (200 to 600), triethylene glycol, glycerol, 1,2,6-hexanetriol, 1,2,4-butanetriol, 3-methylpentane-1,3,5-triol, 1,5-pentanediol, N-methyl-2-pyrrolidone, N-hydroxyethyl-2-pyrrolidone, 2-pyrrolidone and 1,3-dimethylimidazolidinone.

By using such a water-soluble organic solvent, not only the solubility stability of the phthalocyanine compound of formula (2) or (3) can be improved, but also the evaporation of water component for use in the ink composition can be prevented. Therefore, even after the long-term storage of the ink composition, or the long-term intermission of printing operation, the ink-jet printing can be resumed with stable ink ejection performance.

In particular, when a pyrrolidone derivative such as N-hydroxyethyl-2-pyrrolidone is added to the recording ink composition, the dispersion stability of the phthalocyanine compound of formula (1) in the form of particles can be improved, thereby enhancing the preservation stability of the ink composition. Therefore, the ink ejection is stably carried out in the course of ink-jet printing even after the ink composition is allowed to stand for an extended period of time.

In addition, for the purpose of adjusting the surface tension of the ink composition, the recording ink composition of the present invention may further comprise other surfactants than the above-mentioned anionic surfactants (5) and (6), and nonionic surfactants (7) and (8).

In this case, there can be employed alkyl ethers and aryl ethers derived from polyhydric alcohols, such as diethylene glycol monophenyl ether, ethylene glycol monophenyl ether, ethylene glycol monoaryl ether, diethylene glycol monophenyl ether, diethylene glycol monobutyl ether, propylene glycol monobutyl ether, and tetraethylene glycol chlorophenyl ether; polyoxyethylene polyoxypropylene block copolymer; fluorochemical surfactants; and lower alcohols such as ethanol and 2-propanol. In particular, diethylene glycol monobutyl ether is most preferably employed in the present invention.

With respect to the colorant for use in the recording ink composition, the above-mentioned phthalocyanine compound (1) and phthalocyanine compound of formula (2) or (3) are used together. When necessary, other colorants may be used in combination. Such colorants include water-soluble dyes and pigments with excellent water resistance and light resistance. There can be employed the water-soluble dyes, which are divided into the following groups in accordance with the color index number, an acid dye, a direct dye, a basic dye, a reactive dye and a food dye. Those dyes may be contained in the recording ink composition of the present invention so long as the water resistance and the light resistance are not impaired.

Specific examples of the acid dye and the food dye are as follows:

C.I. Acid Yellow 17, 23, 42, 44, 79, 142;

C.I. Acid Red 1, 8, 13, 14, 18, 26, 27, 35, 37, 42, 52, 82, 87, 89, 92, 97, 106, 111, 114, 115, 134, 186, 249, 254, 289;

C.I. Acid Blue 9, 29, 45, 92, 249;

C.I. Acid Black 1, 2, 7, 24, 26, 94;

C.I. Food Yellow 3, 4;

C.I. Food Red 7, 9, 14; and

C.I. Food Black 1, 2.

Specific examples of the direct dye are as follows:

C.I. Direct Yellow 1, 12, 24, 26, 33, 44, 50, 86, 120, 132, 142, 144;

C.I. Direct Red 1, 4, 9, 13, 17, 20, 28, 31, 39, 80, 81, 83, 89, 225, 227;

C.I. Direct Orange 26, 29, 62, 102;

C.I. Direct Blue 1, 2, 6, 15, 22, 25, 71, 76, 79, 86, 87, 90, 98, 163, 165, 199, 202; and C.I. Direct Black 19, 22, 32, 38, 51, 56, 71, 74, 75, 77, 154, 168, 171.

Specific examples of the basic dye are as follows:

C.I. Basic Yellow 1, 2, 11, 13, 14, 15, 19, 21, 23, 24, 25, 28, 29, 32, 36, 40, 41, 45, 49, 51, 53, 63, 64, 65, 67, 70, 73, 77, 87, 91;

C.I. Basic Red 2, 12, 13, 14, 15, 18, 22, 23, 24, 27, 29, 35, 36, 38, 39, 46, 49, 51, 52, 54, 59, 68, 69, 70, 73, 78, 82, 102, 104, 109, 112;

C.I. Basic Blue 1, 3, 5, 7, 9, 21, 22, 26, 35, 41, 45, 47, 54, 62, 65, 66, 67, 69, 75, 77, 78, 89, 92, 93, 105, 117, 120, 122, 124, 129, 137, 141, 147, 155; and C.I. Basic Black 2, 8.

Specific examples of the reactive dye are as follows:

C.I. Reactive Black 3, 4, 7, 11, 12, 17;

C.I. Reactive Yellow 1, 5, 11, 13, 14, 20, 21, 22, 25, 40, 47, 51, 55, 65, 67;

C.I. Reactive Red 1, 14, 17, 25, 26, 32, 37, 44, 46, 55, 60, 66, 74, 79, 96, 97; and C.I. Reactive Blue 1, 2, 7, 14, 15, 23, 32, 35, 38, 41, 63, 80, 95.

Of the above-mentioned water-soluble dyes, the acid dye and the direct dye are particularly preferable.

Examples of the pigment serving as the colorant in the recording ink composition of the present invention include organic pigments such as azo pigments, phthalocyanine pigments, anthraquinone pigments, dioxazine pigments, indigo pigments, thioindigo pigments, perylene pigments isoindolenone pigments, Aniline Black, azomethine pigments, Rhodamine B lake pigments, and carbon black; and inorganic pigments such as iron oxide, titanium oxide, calcium carbonate, barium sulfate, aluminum hydroxide, barium yellow, prussian blue, cadmium red, chrome yellow, and metal powder.

In addition to the above, the recording ink composition of the present invention may further comprise conventionally known additives such as an antiseptic agent, a mildewproofing agent, a corrosion inhibitor, a pH adjustor, a chelate reagent, a water-soluble ultraviolet absorbing agent, and a water-soluble infrared absorbing agent.

For instance, sodium dehydroacetate, sodium sorbate, sodium 2-pyridinethiol-1-oxide, sodium benzoate, and sodium pentachlorophenol can be employed as the antiseptic agents and mildewproofing agents.

Examples of the corrosion inhibitor are acid sulfite, sodium thiosulfate, ammon thiodiglycollic acid, diisopropyl ammonium nitrite, pentaerythritol tetranitrate, and dicyclohexyl ammonium nitrite.

Any materials that is capable of adjusting the obtained aqueous ink composition to pH 6 or more without having no adverse effect on the ink composition can freely be employed as the pH adjustors in the present invention.

Examples of the pH adjustor for use in the present invention are amines such as diethanolamine and triethanolamine; hydroxides of alkali metals such as lithium hydroxide, sodium hydroxide and potassium hydroxide; other hydroxides such as ammonium hydroxide, quaternary ammonium hydroxide and quaternary phosphonium hydroxide; and carbonates of alkali metals such as lithium carbonate, sodium carbonate, and potassium carbonate.

Examples of the chelate reagent for use in the recording ink composition of the present invention include sodium ethylene diamine tetraacetate, sodium nitrilotriacetate, sodium hydroxyethyl ethylene diamine triacetate, sodium diethylene triamine pentaacetate, and sodium uramil diacetate.

It is preferable that the ink composition be adjusted to pH 6 or more, more preferably in the range of pH 6 to pH 11 in order to improve the preservation stability of the ink composition. When the ink composition is adjusted to pH 6 or more, ink-jet printing can be stably carried out without clogging of the nozzle, for example, even after the ink composition is allowed to stand in an ink cartridge of the ink-jet printer.

When the anionic surfactant of formula (6) is added to the ink composition, it is preferable to adjust the obtained ink composition in the pH range of 6 to 9. This is because the surfactant is easily decomposed, thereby changing the physical properties of the ink composition during the storage of the ink composition if the pH of the ink composition exceeds 9.

According to the present invention, color images can be recorded on an image-receiving medium, by ejecting the previously mentioned recording ink composition of the present invention in the form of droplets with a weight of 10 ng to 160 ng by the application of thermal or mechanical energy thereto, for instance, from a nozzle with an ejection diameter of 20 to 60 $\mu$m at an ejection speed of 5 to 20 m/s. Thus, the color images with sufficient water resistance and light resistance, excellent color reproduction, sufficient sharpness and high resolution can be formed on the image receiving medium, in particular, a sheet of plain paper with a Stöckigt size degree (as defined in the Japanese Industrial Standards P-8122) of 3 seconds or more.

According to the above-mentioned ink jet recording method, when the ink composition of the present invention is deposited on the image receiving medium with a Stöckigt size degree of 3 seconds or more in a deposition amount of 20 pl/mm$^2$ to 200 pl/mm$^2$, color images can be formed with a resolution of as high as 10 dot/mm×10 dot/mm or more.

Most of copy papers and other recording papers used in offices have a pH of 5 to 6. On those papers, there can be formed color images with excellent water resistance and light resistance, improved color reproduction and sharpness and high resolution by the ink-jet printing method using the recording ink composition according to the present invention.

Furthermore, the recording ink composition of the present invention can also be used for the formation of images with high transparency on a transparent sheet for use with the OHP. When the thus formed color images are projected on a screen by use of the OHP, the color development of the color images is excellent.

Other features of this invention will become apparent in the course of the following description of exemplary embodiments, which are given for illustration of the invention and are not intended to be limiting thereof.

EXAMPLE 1

A mixture of the following components was stirred and dissolved:

|  | wt. % |
|---|---|
| Phthalocyanine compound (1-1) | 1.0 |
| Phthalocyanine compound (2-1) | 1.0 |
| Styrene - acrylic acid copolymer | 0.4 |
| Glycerol | 5 |
| N-hydroxyethyl pyrrolidone | 5 |
| Anionic surfactant (5-1) | 0.8 |
| Sodium dehydroacetate | 0.2 |
| Ion-exchange water | Balance |

In the above-mentioned formulation, the phthalocyanine compound (1-1) was previously dispersed in the presence of a dispersant in an ultrasonic homogenizer, thereby obtaining a dispersion containing the finely-divided particles of the phthalocyanine compound (1-1) with a particle diameter of 0.1 μm or less.

The thus obtained mixture was adjusted to pH 8.5 by the addition of 10% aqueous solution of lithium hydroxide. The thus obtained mixture was filtered through a Teflon filter of 0.8 μm, so that an ink composition No. 1 according to the present invention was obtained.

EXAMPLE 2

A mixture of the following components was stirred and dissolved:

|  | wt. % |
|---|---|
| Phthalocyanine compound (1-1) | 1.2 |
| Phthalocyanine compound (1-4) | 0.8 |
| Phthalocyanine compound (2-2) | 0.6 |
| 1,2,6-hexanetriol | 4 |
| 1,5-pentanediol | 8 |
| Anionic surfactant (5-1) | 1.2 |
| 25% aqueous solution of hydroxide (4-1) | 0.8 |
| Sodium alginate | 0.05 |
| Urea | 5 |
| Sodium 2-pyridinethiol-1-oxide | 0.2 |
| Ion-exchange water | Balance |

In the above-mentioned formulation, the phthalocyanine compounds (1-1) and (1-4) were previously dispersed in the presence of a dispersant in an ultrasonic homogenizer, thereby obtaining a dispersion containing the finely-divided particles of the phthalocyanine compounds (1-1) and (1-4) with a particle diameter of 0.1 μm or less.

The thus obtained mixture was adjusted to pH 8.8 by the addition of 10% aqueous solution of sodium hydroxide. The thus obtained mixture was filtered through a Teflon filter of 0.8 μm, so that an ink composition No. 2 according to the present invention was obtained.

EXAMPLE 3

A mixture of the following components was stirred and dissolved:

|  | wt. % |
|---|---|
| Phthalocyanine compound (1-3) | 1 |
| Phthalocyanine compound (2-5) | 0.5 |
| Phthalocyanine compound (3-3) | 0.5 |
| Diethylene glycol | 5 |
| Glycerol | 5 |
| Styrene - acrylic acid copolymer | 0.5 |
| Nonionic surfactant (7) with the following formula: | 2 |

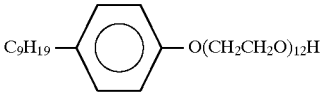

| 25% aqueous solution of hydroxide (4-3) | 0.2 |
| Sodium dehydroacetate | 0.2 |
| Ion-exchange water | Balance |

In the above-mentioned formulation, the phthalocyanine compound (1-3) was previously dispersed in the presence of a dispersant in an ultrasonic homogenizer, thereby obtaining a dispersion containing the finely-divided particles of the phthalocyanine compound (1-3) with a particle diameter of 0.1 μm or less.

The thus obtained mixture was adjusted to pH 8.5 by the addition of 10% aqueous solution of lithium hydroxide. The thus obtained mixture was filtered through a Teflon filter of 0.8 μm, so that an ink composition No. 3 according to the present invention was obtained.

EXAMPLE 4

A mixture of the following components was stirred and dissolved:

|  | wt. % |
|---|---|
| Phthalocyanine compound (1-3) | 1.0 |
| Phthalocyanine compound (3-1) | 1.2 |
| Ethylene glycol | 5 |
| Glycerol | 2 |
| 1,5-pentanediol | 8 |
| 2-pyrrolidone | 2 |
| Polyoxyethylene - polyoxypropylene block copolymer | 1 |
| Nonionic surfactant of formula (8) {m, n = 20} | 0.8 |
| 25% aqueous solution of hydroxide (4-4) | 2 |
| Urea | 5 |
| Sodium benzoate | 0.2 |
| Ion-exchange water | Balance |

In the above-mentioned formulation, the phthalocyanine compound (1-3) was previously dispersed in the presence of a dispersant in an ultrasonic homogenizer, thereby obtaining a dispersion containing the finely-divided particles of the phthalocyanine compound (1-3) with a particle diameter of 0.1 μm or less.

The thus obtained mixture was adjusted to pH 9.5 by the addition of 10% aqueous solution of lithium hydroxide. The thus obtained mixture was filtered through a Teflon filter of 0.8 μm, so that an ink composition No. 4 according to the present invention was obtained.

EXAMPLE 5

A mixture of the following components was stirred and dissolved:

|  | wt. % |
|---|---|
| Phthalocyanine compound (1-4) | 1.2 |
| Phthalocyanine compound (2-1) | 0.3 |
| Phthalocyanine compound (3-3) | 0.5 |
| Triethylene glycol | 5 |
| 3-methylpentane-1,3,5-triol | 10 |
| N-methyl-2-pyrrolidone | 5 |
| Anionic surfactant (6-1) | 2 |
| 25% aqueous solution of hydroxide (4-2) | 1.5 |
| Hydroxyethyl urea | 5 |
| Sodium 2-pyridinethiol-1-oxide | 0.2 |
| Ion-exchange water | Balance |

In the above-mentioned formulation, the phthalocyanine compound (1-4) was previously dispersed in the presence of a dispersant in an ultrasonic homogenizer, thereby obtaining a dispersion containing the finely-divided particles of the phthalocyanine compound (1-4) with a particle diameter of 0.1 μm or less.

The thus obtained mixture was adjusted to pH 7.8 by the addition of 10% aqueous solution of sodium hydroxide. The thus obtained mixture was filtered through a Teflon filter of 0.8 μm, so that an ink composition No. 5 according to the present invention was obtained.

EXAMPLE 6

A mixture of the following components was stirred and dissolved:

|  | wt. % |
|---|---|
| Phthalocyanine compound (1-3) | 1.5 |
| Phthalocyanine compound (2-5) | 1.6 |
| 2-pyrrolidone | 8 |
| Glycerol | 7 |
| Nonionic surfactant of formula (8) {m + n = 15} | 1 |
| Nonionic surfactant of formula (8) {m, n = 20} | 1 |
| 25% aqueous solution of hydroxide (4-7) | 2 |
| Hydroxyethyl urea | 5 |
| Sodium dehydroacetate | 0.2 |
| Ion-exchange water | Balance |

In the above-mentioned formulation, the phthalocyanine compound (1-3) was previously dispersed in the presence of a dispersant in an ultrasonic homogenizer, thereby obtaining a dispersion containing the finely-divided particles of the phthalocyanine compound (1-3) with a particle diameter of 0.1 μm or less.

The thus obtained mixture was adjusted to pH 8 by the addition of 10% aqueous solution of lithium hydroxide. The thus obtained mixture was filtered through a Teflon filter of 0.8 μm, so that an ink composition No. 6 according to the present invention was obtained.

EXAMPLE 7

A mixture of the following components was stirred and dissolved:

|  | wt. % |
|---|---|
| Phthalocyanine compound (1-1) | 1.2 |
| Phthalocyanine compound (1-5) | 0.3 |
| Phthalocyanine compound (3-2) | 0.8 |
| N-methyl-2-pyrrolidone | 8 |
| 1,5-pentanediol | 8 |
| Anionic surfactant (5-4) | 0.8 |
| Sodium benzoate | 0.5 |
| Ion-exchange water | Balance |

In the above-mentioned formulation, the phthalocyanine compounds (1-1) and (1-5) were previously dispersed in the presence of a dispersant in an ultrasonic homogenizer, thereby obtaining a dispersion containing the finely-divided particles of the phthalocyanine compounds (1-1) and (1-5) with a particle diameter of 0.1 μm or less.

The thus obtained mixture was adjusted to pH 8 by the addition of 10% aqueous solution of lithium hydroxide. The thus obtained mixture was filtered through a Teflon filter of 0.8 μm, so that an ink composition No. 7 according to the present invention was obtained.

EXAMPLE 8

A mixture of the following components was stirred and dissolved:

|  | wt. % |
|---|---|
| Phthalocyanine compound (1-1) | 1.5 |
| Phthalocyanine compound (3-1) | 1.0 |
| C.I. Direct Blue 199 | 1.0 |
| Thiodiethanol | 5 |
| Glycerol | 10 |
| Nonionic surfactant (7) with the following formula: | 1.5 |
| 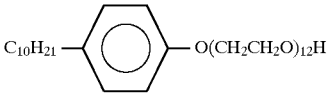 | |
| Sodium benzoate | 0.5 |
| Ion-exchange water | Balance |

In the above-mentioned formulation, the phthalocyanine compound (1-1) was previously dispersed in the presence of a dispersant in an ultrasonic homogenizer, thereby obtaining a dispersion containing the finely-divided particles of the phthalocyanine compound (1-1) with a particle diameter of 0.1 μm or less.

The thus obtained mixture was adjusted to pH 7.5 by the addition of 10% aqueous solution of lithium hydroxide. The thus obtained mixture was filtered through a Teflon filter of 0.8 μm, so that an ink composition No. 8 according to the present invention was obtained.

EXAMPLE 9

A mixture of the following components was stirred and dissolved:

|  | wt. % |
|---|---|
| Phthalocyanine compound (1-1) | 1.5 |
| Phthalocyanine compound (1-4) | 1.0 |

-continued

|  | wt. % |
|---|---|
| Phthalocyanine compound (3-1) | 0.5 |
| 2-pyrrolidone | 5.0 |
| Glycerol | 15.0 |
| Nonionic surfactant of formula (8) {m + n = 40} | 1.0 |
| Anionic surfactant (5-2) | 1.0 |
| Sodium pentachlorophenol | 0.2 |
| Ion-exchange water | Balance |

In the above-mentioned formulation, the phthalocyanine compounds (1-1) and (1-4) were previously dispersed in the presence of a dispersant in an ultrasonic homogenizer, thereby obtaining a dispersion containing the finely-divided particles of the phthalocyanine compounds (1-1) and (1-4) with a particle diameter of 0.1 μm or less.

The thus obtained mixture was adjusted to pH 8 by the addition of 10% aqueous solution of lithium hydroxide. The thus obtained mixture was filtered through a Teflon filter of 0.8 μm, so that an ink composition No. 9 according to the present invention was obtained.

EXAMPLE 10

A mixture of the following components was stirred and dissolved:

|  | wt. % |
|---|---|
| Phthalocyanine compound (1-1) | 1.0 |
| Phthalocyanine compound (3-1) | 0.8 |
| Phthalocyanine compound (3-5) | 0.2 |
| 2-pyrrolidone | 5.0 |
| Glycerol | 15.0 |
| Nonionic surfactant of formula (8) {m + n = 40} | 2.0 |
| Anionic surfactant (5-2) | 1.0 |
| Sodium dehydroacetate | 0.2 |
| Ion-exchange water | Balance |

In the above-mentioned formulation, the phthalocyanine compound (1-1) was previously dispersed in the presence of a dispersant in an ultrasonic homogenizer, thereby obtaining a dispersion containing the finely-divided particles of the phthalocyanine compound (1-1) with a particle diameter of 0.1 μm or less.

The thus obtained mixture was adjusted to pH 8 by the addition of 10% aqueous solution of lithium hydroxide. The thus obtained mixture was filtered through a Teflon filter of 0.8 μm, so that an ink composition No. 10 according to the present invention was obtained.

Comparative Example 1

The procedure for preparation of the ink composition No. 1 in Example 1 was repeated except that a mixture of the phthalocyanine compound (1-1) and the phthalocyanine compound (2-1) in the formulation for the ink composition No. 1 in Example 1 was replaced by C.I. Acid Blue 249.

Thus, a comparative ink composition No. 1 was obtained.

Comparative Example 2

The procedure for preparation of the ink composition No. 2 in Example 2 was repeated except that a mixture of the phthalocyanine compound (1-1) and the phthalocyanine compound (1-4) in the formulation for the ink composition No. 2 in Example 2 was replaced by C.I. Direct Blue 199.

Thus, a comparative ink composition No. 2 was obtained.

Comparative Example 3

The procedure for preparation of the ink composition No. 3 in Example 3 was repeated except that the 25% aqueous solution of hydroxide (4-3), the styrene-acrylic acid copolymer, and the nonionic surfactant (7) were removed from the formulation for the ink composition No. 3 in Example 3, and that the pH of the ink composition was changed from 8.5 to 4.5.

Thus, a comparative ink composition No. 3 was obtained.

Comparative Example 4

The procedure for preparation of the ink composition No. 3 in Example 3 was repeated except that the nonionic surfactant (7) for use in the formulation for the ink composition No. 3 in Example 3 was replaced by sodium di(isobutyl)sulfosuccinate.

Thus, a comparative ink composition No. 4 was obtained.

Comparative Example 5

The procedure for preparation of the ink composition No. 4 in Example 4 was repeated except that the phthalocyanine compound (3-1) for use in the formulation for the ink composition No. 4 in Example 4 was replaced by C.I. Acid Blue 1.

Thus, a comparative ink composition No. 5 was obtained.

Comparative Example 6

The procedure for preparation of the ink composition No. 6 in Example 6 was repeated except that the 25% aqueous solution of hydroxide (4-7), and the nonionic surfactants (8) were removed from the formulation for the ink composition No. 6 in Example 6, and that lithium hydroxide was replaced by potassium hydroxide for adjusting the ink composition to pH 8.

Thus, a comparative ink composition No. 6 was obtained.

Comparative Example 7

The procedure for preparation of the ink composition No. 1 in Example 1 was repeated except that the phthalocyanine compound (2-1) for use in the formulation for the ink composition No. 1 in Example 1 was replaced by C.I. Direct Blue 25, and that lithium hydroxide was replaced by ammonium hydroxide for adjusting the ink composition to 8.5.

Thus, a comparative ink composition No. 7 was obtained.

Each of the ink compositions Nos. 1 to 10 according to the present invention and the comparative ink compositions Nos. 1 to 7 was subjected to the following evaluation tests:

(1) Image Clearness Inspection Test

Each recording ink composition was separately filled into (i) a thermal ink-jet printer with a head having 104 nozzles with 300 dpi having a nozzle diameter of 45 μm, and (ii) an ink-jet printer with a head having 128 nozzles with a nozzle diameter of 33 μm, capable of ejecting the ink composition therefrom by the application of pressure thereto by the action of a piezoelectric element of PZT.

In this test, ink jet printing was conducted on three kinds of papers, that is, recycled paper, high quality paper, and bond paper. The image quality of the printed images was evaluated by visual inspection from the viewpoints of the image blurring, the blurring at the boundaries of a secondary color obtained by superimposing two colored ink compositions, the color tone and the image density.

The results are shown in TABLE 1.

○: High quality images were formed on all of the three kinds of papers.

Δ: The image quality formed on at least one kind of paper was satisfactory.

x: The image quality was unsatisfactory on any of the three kinds of papers.

(2) Image Formation Test on PET Film

Using each of the ink compositions obtained in Examples 1 to 10 and Comparative Examples 1 to 7, images were formed on a polyethylene terephthalate (PET) film comprising an overcoat layer comprising as the main component PVA. In addition, secondary color images were formed on the same film by superimposing the above-mentioned cyan ink composition, and a magenta color ink composition and a yellow color ink composition which were separately prepared.

Then, the color-image-bearing PET film was projected on a screen using the overhead projector to evaluate the color development performance.

The results are shown in TABLE 1.

○: The transparency of the obtained color images was very high, and color development of a blue color and a green color was excellent.

Δ: Color development of a cyan color image obtained by using the cyan ink composition singly was satisfactory, but color development of a blue color or a green color was vague.

x: There were observed ununiform and vague portions even in a cyan color image portion.

(3) Water Resistance Inspection Test

A printed-image-bearing sample was prepared by printing images on the above-mentioned three kinds of papers using each of the recording ink compositions. Each printed-image-bearing sample was immersed in water at 30° C. for one minute, and the image densities of the printed image were measured by use of a McBeth densitometer before and after water immersion. The water resistance of the image obtained by each aqueous ink composition was determined in terms of the fading ratio by percentage:

$$\text{Fading Ratio (\%)} = \left[1 - \frac{\text{I.D. after water immersion}}{\text{I.D. before water immersion}}\right] \times 100$$

The results are shown in TABLE 1.

○: With respect to all of the three kinds of papers, the fading ratio<20%.

Δ: With respect to any of the three kinds of papers, 20%≦the fading ratio<30%.

x: With respect to any of the three kinds of papers, fading ratio≧30%.

(4) Drying Characteristics Inspection Test

A sheet of filter paper was brought into pressure contact with the printed image immediately after the images were printed on the above-mentioned three kinds of papers. The drying characteristics of the ink compositions were expressed by the time period from the contact of the filter paper with the printed images until no more images were transferred to the filter paper.

The results are shown in TABLE 1.

○: The printed image was dried within 10 seconds with respect to all the three kinds of papers.

x: The printed image formed on any paper was not dried within 10 seconds.

(5) Preservation Stability Test

Four samples of each ink composition were separately placed in a polyethylene container, and allowed to stand at −20° C., 5° C., 20° C. and 70° C. for three months. After the storage of three months, the presence or absence of a precipitate in each sample was visually inspected, and the changes in the physical properties such as the surface tension and viscosity were inspected.

The results are shown in TABLE 1.

○: The physical properties of the ink composition were not changed under any of the above-mentioned preservation temperature conditions.

Δ: The physical properties of the ink composition were considerably changed under any of the above-mentioned preservation temperature conditions although no precipitate was observed in any case.

x: The physical properties of the ink composition were considerably changed, and precipitates were observed under any of the above-mentioned preservation temperature conditions.

(6) Ink-ejection Performance Reliability Test

Each ink composition was filled into the ink-jet printer with a head having 128 nozzles with a nozzle diameter of 30 μm, driven by the action of PZT. The printing operation was continuously carried out without capping the printer head and also without cleaning the nozzles. Then, the printing operation was stopped and again started after intermission. The ink-ejecting reliability of each ink composition was evaluated by the possible intermission time until the ink-ejecting directions from the nozzles were deviated from their own original directions, or the weight of the ejected ink droplet was changed.

The results are shown in TABLE 1.

○: There was no problem after intermission of 600 seconds.

Δ: There was a slight change in weight of the ejected ink droplet and a slight deviation in ink-ejecting direction after intermission of 600 seconds.

x: The nozzles were clogged with the ink composition after the intermission of 600 seconds or less.

TABLE 1

|  | Image Clearness | Image Quality on OHP Film | Water Resistance | Drying Characteristics | Preservation Stability | Reliability of Ink-ejection Performance |
|---|---|---|---|---|---|---|
| Ex. 1 | ○ | ○ | ○ | ○ | ○ | ○ |
| Ex. 2 | ○ | ○ | ○ | ○ | ○ | ○ |
| Ex. 3 | ○ | ○ | ○ | ○ | ○ | ○ |
| Ex. 4 | ○ | ○ | ○ | ○ | ○ | ○ |
| Ex. 5 | ○ | ○ | ○ | ○ | ○ | ○ |
| Ex. 6 | ○ | ○ | ○ | ○ | ○ | ○ |
| Ex. 7 | ○ | ○ | ○ | ○ | ○ | ○ |
| Ex. 8 | ○ | ○ | ○ | ○ | ○ | ○ |
| Ex. 9 | ○ | ○ | ○ | ○ | ○ | ○ |
| Ex. 10 | ○ | ○ | ○ | ○ | ○ | ○ |
| Comp. Ex. 1 | Δ(*) | ○ | x | ○ | ○ | ○ |
| Comp. Ex. 2 | Δ(*) | ○ | Δ | ○ | Δ(**) | Δ |
| Comp. Ex. 3 | x | Δ | ○ | x | x(**) | x |
| Comp. Ex. 4 | x | Δ | ○ | x | x | Δ |
| Comp. Ex. 5 | ○ | Δ | x | ○ | ○ | ○ |
| Comp. Ex. 6 | x | x | ○ | x | x | x |
| Comp. Ex. 7 | Δ | x | Δ | ○ | x | Δ |

(*) The color tone was unsatisfactory.
(**) The preservation stability was poor at the low temperature.

As can be seen from the results shown in TABLE 1, the recording ink compositions according to the present invention can produce clear color images with excellent color reproduction and high image density without image blurring. In addition, the ink images formed on any recording papers are superior in terms of the water resistance and drying characteristics. Furthermore, the preservation stability of the ink compositions prepared in Examples 1 to 10 is excellent, so that ink-jet printing can be stably carried out with high reliability of ink ejection after a long-term storage or intermission of printing operation.

In contrast to this, the color tone of the recorded image was considerably changed and the water resistance thereof is insufficient when the ink images were printed using the comparative ink composition No. 1.

In the case where the comparative ink composition No. 2 was employed, the color reproduction of the recorded image was poor, and the water resistance thereof was also insufficient. In addition, the change in the physical properties of the ink composition was significant when the ink composition was stored at low temperatures.

When the ink-jet printing was performed using the comparative ink compositions Nos. 3, 4 and 6, the image density was not uniform in the recorded images due to insufficient drying characteristics thereof, so that the sharpness was lacking. Further, the dispersion stability of the colorant was poor, thereby decreasing the preservation stability of the ink composition. Therefore, the reliability of ink-ejection was caused to deteriorate.

The images recorded by use of the comparative ink composition No. 5 were inferior in terms of the water resistance.

When the ink images were recorded using the comparative ink composition No. 7, not only the image clearness was insufficient, and the water resistance of the recorded images was poor, but also the preservation stability of the ink composition was inferior.

When the images were printed on the transparent sheet for use with the OHP, the recording ink compositions of the present invention were capable of producing clear images with high transparency on the transparent sheet although the comparative ink compositions prepared in Comparative Examples 3 to 7 were not adapted for the formation of ink images on the OHP film.

As previously mentioned, the recording ink composition according to the present invention has excellent color tone of a cyan color, and is capable of producing color images with excellent color reproduction and sufficient water resistance and light resistance. In particular, colored images of a blue color and a green color with excellent color reproduction can be formed, and ink images with excellent transparency can be formed on a transparent sheet for use with the OHP.

The drying characteristics of the ink image formed on a sheet of plain paper are improved, and at the same time, the image blurring can be prevented, whereby clear images can be obtained.

Furthermore, since the preservation stability of the recording ink composition according to the present invention is excellent, the reliability of ink-ejection performance can be maintained after a long-term storage of the ink composition.

According to the ink-jet printing method using the above-mentioned recording ink composition of the present invention, there can be formed on an image receiving medium clear color images with excellent color reproduction and high water resistance and light resistance. Therefore, the resolution of the obtained image can be increased.

Japanese Patent Application No. 08-214404 filed Jul. 25, 1996 is hereby incorporated by reference.

What is claimed is:

1. A recording ink composition comprising:
a colorant which is soluble or dispersible in water and comprises at least one phthalocyanine compound represented by formula (1),

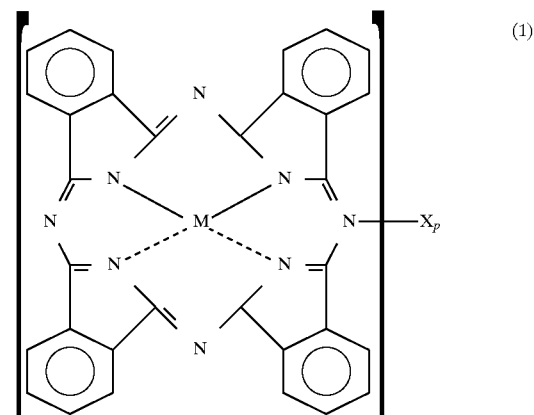

wherein M is a hydrogen atom, Cu, Fe, Co or Ni, X is a halogen atom, and p is an integer of 0 to 8; and at least one phthalocyanine compound selected from the group consisting of compounds represented by formulas (2) and (3),

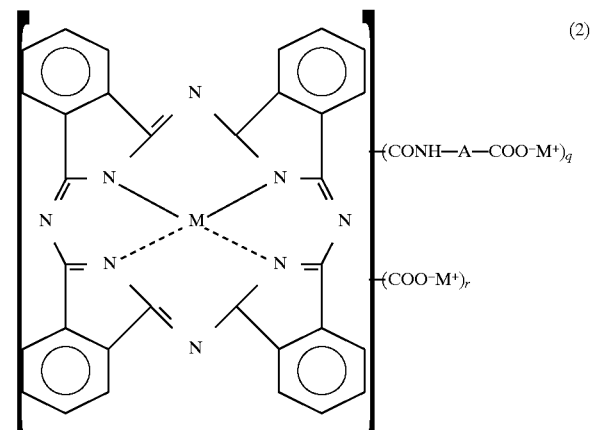

wherein M is a hydrogen atom, Cu, Fe, Co or Ni; A is a phenylene group or a straight-chain or branched alkylene group having 1 or more carbon atoms, $M^+$ is a cation selected from the group consisting of alkali metal cation, quaternary ammonium cation, quaternary phosphonium cation, and alkanolamine cation, and q is an integer of 0 to 4, and r is an integer of 0 to 8, provided that q and r cannot be 0 (zero) at the same time; and

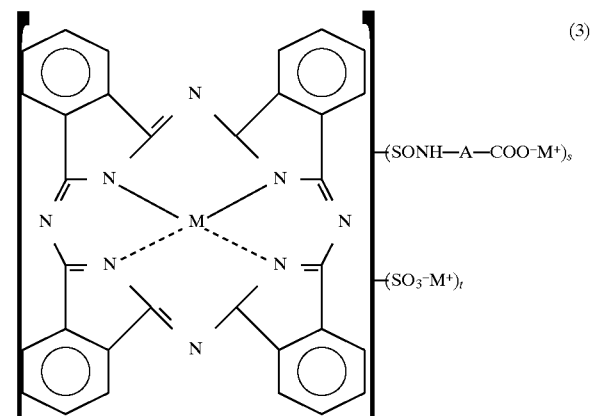

wherein M is a hydrogen atom, Cu, Fe, Co or Ni, A is a phenylene group or a straight-chain or branched alkylene group having 1 or more carbon atoms, $M^+$ is a cation selected from the group consisting of alkali metal cation, quaternary ammonium cation, quaternary phosphonium cation, and alkanolamine cation, and s is an integer of 0 to 4, and t is an integer of 0 to 4, provided that s and t cannot be 0 (zero) at the same time;

a dispersant comprising at least one dispersant component selected from the group consisting of at least one polymeric compound having a hydrophilic moiety and a hydrophobic moiety, and at least one surfactant having an alkyl group having 5 or more carbon atoms;

water; and a humectant.

2. The recording ink composition as claimed in claim 1, wherein said phthalocyanine compound of formula (1) is in the form of particles with a particle diameter in a range of 0.01 to 0.1 μm.

3. The recording ink composition as claimed in claim 1, wherein, in formulas (2) and (3), said alkali metal cation represented by M$^+$ is selected from the group consisting of Na$^+$ and Li$^+$; said quaternary ammonium cation represented by M$^+$ is represented by formula (4-a):

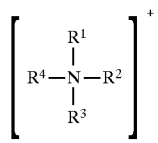  (4-a)

wherein R$^1$ to R$^4$ each is selected from the group consisting of a hydrogen atom, an alkyl group having 1 to 4 carbon atoms, and a halogenated alkyl group having 1 to 4 carbon atoms; said alkanolamine cation represented by M$^+$ is a cation represented by formula (4-b):

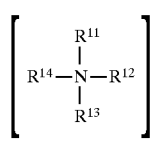  (4-b)

wherein at least one of R$^{11}$ to R$^{14}$ is a hydroxyalkyl group having 1 to 4 carbon atoms, and the other is selected from the group consisting of a hydrogen atom, an alkyl group having 1 to 4 carbon atoms, and a halogenated alkyl group having 1 to 4 carbon atoms; and said quaternary phosphonium cation represented by M$^+$ is a cation represented by formula (4-c):

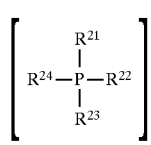  (4-c)

wherein R$^{21}$ to R$^{24}$ each is selected from the group consisting of a hydrogen atom, an alkyl group having 1 to 4 carbon atoms, a hydroxyalkyl group having 1 to 4 carbon atoms, and a halogenated alkyl group having 1 to 4 carbon atoms.

4. The recording ink composition as claimed in claim 1, wherein said surfactant having an alkyl group having 5 or more carbon atoms comprises an anionic surfactant selected from the group consisting of:

a polyoxyethylene alkyl ether acetate of formula (5),

  (5)

wherein R$^5$ is a straight-chain or branched alkyl group having 6 to 14 carbon atoms, M$^+$ is a cation selected from the group consisting of alkali metal cation, quaternary ammonium cation, quaternary phosphonium cation and alkanolamine cation, and m is an integer of 3 to 12; and a dialkylsulfosuccinate of formula (6),

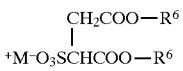  (6)

wherein R$^6$ is a branched alkyl group having 5 to 7 carbon atoms, and M$^+$ is a cation selected from the group consisting of alkali metal cation, quaternary ammonium cation, quaternary phosphonium cation and alkanolamine cation.

5. The ink composition as claimed in claim 4, wherein said ink composition has a surface tension of 50 mN/m or less.

6. The recording ink composition as claimed in claim 4, wherein, in formulas (5) and (6), said alkali metal cation represented by M$^+$ is selected from the group consisting of Na$^+$ and Li$^+$; said quaternary ammonium cation represented by M$^+$ is represented by formula (4-a):

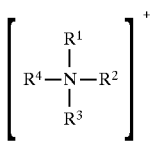  (4-a)

wherein R$^1$ to R$^4$ each is selected from the group consisting of a hydrogen atom, an alkyl group having 1 to 4 carbon atoms, and a halogenated alkyl group having 1 to 4 carbon atoms; said alkanolamine cation represented by M$^+$ is a cation represented by formula (4-b):

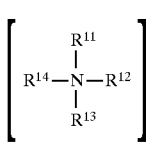  (4-b)

wherein at least one of R$^{11}$ to R$^{14}$ is a hydroxyalkyl group having 1 to 4 carbon atoms, and the other is selected from the group consisting of a hydrogen atom, an alkyl group having 1 to 4 carbon atoms, and a halogenated alkyl group having 1 to 4 carbon atoms; and said quaternary phosphonium cation represented by M$^+$ is a cation represented by formula (4-c):

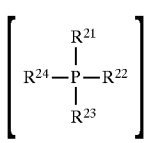  (4-c)

wherein R$^{21}$ to R$^{24}$ each is selected from the group consisting of a hydrogen atom, an alkyl group having 1 to 4 carbon atoms, a hydroxyalkyl group having 1 to 4 carbon atoms, and a halogenated alkyl group having 1 to 4 carbon atoms.

7. The recording ink composition as claimed in claim 1, wherein said surfactant having an alkyl group having 5 or more carbon atoms comprises a nonionic surfactant selected from the group consisting of:

a compound of formula (7),

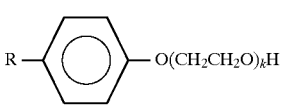  (7)

wherein R is a straight or branched hydrocarbon chain having 6 to 14 carbon atoms, and k is an integer of 5 to 12; and a compound of formula (8), $$CH_3-CH(CH_3)-CH_2-C(CH_3)(O-CH_2-CH_2-O-CH)_m-C\equiv C-C(CH_3)(O-CH_2-CH_2-O-CH)_n-CH_2-CH(CH_3)-CH_3 \quad (8)$$

wherein m and n are each an integer of 0 to 20.

8. The recording ink composition as claimed in claim 7, wherein said recording ink composition has a surface tension of 50 mN/m or less.

9. The recording ink composition as claimed in claim 7, further comprising at least one component selected from the group consisting of urea and urea derivatives.

10. The recording ink composition as claimed in claim 1, wherein said humectant comprises at least one pyrrolidone derivative.

11. The recording ink composition as claimed in claim 1, wherein said recording ink composition is adjusted to pH 6 to 11.

12. A method of recording images on an image receiving medium, comprising the step of ejecting a recording ink composition in the form of droplets by the application of thermal or mechanical energy thereto onto an image receiving medium with a Stöckigt size degree of 3 seconds or more, with said recording ink composition being deposited in an amount of 20 pl/mm² to 200 pl/mm² on said image receiving medium, thereby forming images with a resolution of 10 dots/mm×10 dots/mm or more, said recording ink composition comprising:

a colorant which is soluble or dispersible in water and comprises at least one phthalocyanine compound represented by formula (1), (1) [phthalocyanine structure with M center, N atoms, and $-X_p$ substituent]

wherein M is a hydrogen atom, Cu, Fe, Co or Ni, X is a halogen atom, and p is an integer of 0 to 8; and at least one phthalocyanine compound selected from the group consisting of compounds represented by formulas (2) and (3), (2) [phthalocyanine structure with M center, $-(CONH-A-COO^-M^+)_q$ and $-(COO^-M^+)_r$ substituents]

wherein M is a hydrogen atom, Cu, Fe, Co or Ni; A is a phenylene group or a straight-chain or branched alkylene group having 1 or more carbon atoms, $M^+$ is a cation selected from the group consisting of alkali metal cation, quaternary ammonium cation, quaternary phosphonium cation, and alkanolamine cation, and q is an integer of 0 to 4, and r is an integer of 0 to 8, provided that q and r cannot be 0 (zero) at the same time; and (3) [phthalocyanine structure with M center, $-(SONH-A-COO^-M^+)_s$ and $-(SO_3^-M^+)_t$ substituents]

wherein M is a hydrogen atom, Cu, Fe, Co or Ni, A is a phenylene group or a straight-chain or branched alkylene group having 1 or more carbon atoms, $M^+$ is a cation selected from the group consisting of alkali metal cation, quaternary ammonium cation, quaternary phosphonium cation, and alkanolamine cation, and s is an integer of 0 to 4, and t is an integer of 0 to 4, provided that s and t cannot be 0 (zero) at the same time;

a dispersant comprising at least one dispersant component selected from the group consisting of at least one polymeric compound having a hydrophilic moiety and a hydrophobic moiety, and at least one surfactant having an alkyl group having 5 or more carbon atoms;

water; and a humectant.

* * * * *

UNITED STATES PATENT AND TRADEMARK OFFICE
CERTIFICATE OF CORRECTION

PATENT NO. : 5,882,390

DATED : March 16, 1999

INVENTOR(S): Kiyofumi NAGAI, et al.

It is certified that an error appears in the above-identified patent and that said Letters Patent is hereby corrected as shown below:

Column 15, second column, under (4-8), should read --(4-9)--.

Column 17, line 64, delete "3".

Column 22, line 5, "is" should read --are--.

Signed and Sealed this

Sixteenth Day of January, 2001

Attest:

Q. TODD DICKINSON

*Attesting Officer*    *Commissioner of Patents and Trademarks*